US012330256B2

(12) United States Patent
Gardner et al.

(10) Patent No.: US 12,330,256 B2
(45) Date of Patent: Jun. 17, 2025

(54) METHODS AND APPARATUS FOR PERFORMING MULTIPLE MANUFACTURING OPERATIONS ON AN OBJECT

(71) Applicant: Coventry Associates, Inc., West Boylston, MA (US)

(72) Inventors: Craig Martin Gardner, West Boylston, MA (US); David Sossen, Sherborn, MA (US)

(73) Assignee: Coventry Associates, Inc., West Boylston, MA (US)

( * ) Notice: Subject to any disclaimer, the term of this patent is extended or adjusted under 35 U.S.C. 154(b) by 1123 days.

(21) Appl. No.: 17/251,286

(22) PCT Filed: Jun. 11, 2019

(86) PCT No.: PCT/US2019/036508
§ 371 (c)(1),
(2) Date: Dec. 11, 2020

(87) PCT Pub. No.: WO2019/241219
PCT Pub. Date: Dec. 19, 2019

(65) Prior Publication Data
US 2021/0121997 A1    Apr. 29, 2021

Related U.S. Application Data

(60) Provisional application No. 62/683,921, filed on Jun. 12, 2018.

(51) Int. Cl.
*B23Q 39/02*        (2006.01)
*B23Q 1/54*         (2006.01)
(Continued)

(52) U.S. Cl.
CPC ......... *B23Q 39/024* (2013.01); *B23Q 1/5468* (2013.01); *B24B 27/0023* (2013.01);
(Continued)

(58) Field of Classification Search
CPC ...... B23Q 39/024; B23Q 1/5468; B23Q 7/02;
B24B 27/0023; B24B 27/003;
(Continued)

(56) References Cited

U.S. PATENT DOCUMENTS 4,014,439 A    3/1977  Kochsiek et al.
4,909,682 A *  3/1990  Rudzyanskas ....... B23Q 1/5481
                                                          74/25
(Continued)

FOREIGN PATENT DOCUMENTS

CA    2339845 A1 *  8/1998
CN    106078438 A   11/2016
(Continued)

OTHER PUBLICATIONS

JPH0899242A EspaceNet English Translation (Year: 1996).*
(Continued)

*Primary Examiner* — Makena S Markman
(74) *Attorney, Agent, or Firm* — Smith Baluch LLP

(57) ABSTRACT

A multi-tool positioning and manufacturing system moves a workpiece among many tools, such as grinding wheels, each of which performs a manufacturing operation on the workpiece. The system moves the workpiece automatically, quickly, repeatably, and precisely among the tools, without any manual intervention. It can perform the same manufacturing operations as many separate tools, such as grinding the inner diameter, outer diameter, and rib of a tapered roller bearing cone. Because a machinist does not have to move the workpiece between machines for different operations, the total manufacturing process can be faster and higher (Continued)

yield than with separate tools. The system can also move a single dresser among the tools for dressing and truing, further increasing manufacturing efficiency by eliminating the need for separate dressers for separate tools.

14 Claims, 11 Drawing Sheets

(51) Int. Cl.
  *B24B 27/00* (2006.01)
  *B24B 41/02* (2006.01)
(52) U.S. Cl.
  CPC ...... *B24B 27/0069* (2013.01); *B24B 27/0076* (2013.01); *B24B 41/02* (2013.01)
(58) Field of Classification Search
  CPC ............ B24B 27/0076; B24B 27/0069; B24B 53/005; B24B 5/12; B24B 5/313; B24B 5/32; B24B 7/04; B24B 41/005; B24B 41/02
  USPC ..... 451/51, 11, 274, 292, 291, 85, 403, 400, 451/401, 443
  See application file for complete search history.

(56) References Cited

U.S. PATENT DOCUMENTS

| | | | |
|---|---|---|---|
| 6,120,358 A * | 9/2000 | Porter | B24B 19/02 451/49 |
| 7,803,034 B2 | 9/2010 | Camp et al. | |
| 8,256,092 B1 | 9/2012 | Woodruff et al. | |
| 2004/0176017 A1 | 9/2004 | Zelenski et al. | |
| 2006/0135043 A1 | 6/2006 | Wakazono | |
| 2007/0232196 A1 | 10/2007 | Camp et al. | |
| 2019/0070699 A1 | 3/2019 | Itou | |

FOREIGN PATENT DOCUMENTS

| | | |
|---|---|---|
| DE | 19938058 A1 | 2/2001 |
| DE | 102016107590 A1 | 11/2016 |
| JP | S56134168 A | 10/1981 |
| JP | H0639354 U | 5/1994 |
| JP | H0899242 A * | 4/1996 |
| JP | H1199743 A | 4/1999 |
| JP | 2000039305 A | 2/2000 |
| JP | 2001054829 A | 2/2001 |
| JP | 2017536687 A | 12/2017 |
| JP | 6540198 B2 | 7/2019 |
| TW | 201601872 A | 1/2016 |
| WO | 2017018592 A1 | 2/2017 |

OTHER PUBLICATIONS

Japanese Office Action with translation in Japanese Application No. 2020-569983, dated Dec. 12, 2022, 16 pages.
Japanese Office Action with translation in Japanese Application No. 2020-569983, dated Sep. 11, 2023, 14 pages.
International Search Report and Written Opinion in International Patent Application No. PCT/US19/36508 mailed Aug. 16, 2019, 13 pages.
EPS MultiTool. Coventry Associates. Accessed at https://www.coventryassociates.com/eps-multi-tool/ on Jun. 2, 2021. 4 pages.
International Search Report and Written Opinion in International Patent Application No. PCT/US2021/033655 mailed Aug. 24, 2021, 12 pages.
Chinese Office Action and Search Report in Chinese Application 201980051333.8 dated Sep. 1, 2022, 15 pages.
Chinese (2nd) Office Action with translation in Chinese App.No. 201980051333.8 dated Jun. 1, 2023, 14 pages.
Office Action with translation in Korean Application No. 10-2021-7000991 dated Jul. 31, 2023, 16 pages.
Extended European Search Report in European Application No. 19820478.6 dated Jul. 4, 2022 8 pages.
Chinese Office Action (Rejection) with translation in Chinese Application 201980051333.8 dated Dec. 1, 2023, 16 pages.
Office Action with translation in Korean Application No. 10-2021-7000991 dated Feb. 28, 2024, 7 pages.
Chinese Office Action (Notice of Reexam) with translation in Chinese Application 201980051333.8 dated Sep. 25, 2024, 38 pages.
Office Action (refusal) with translation in Japanese App. No. 2024-001758 mailed Sep. 30, 2024, 12 pages.

* cited by examiner

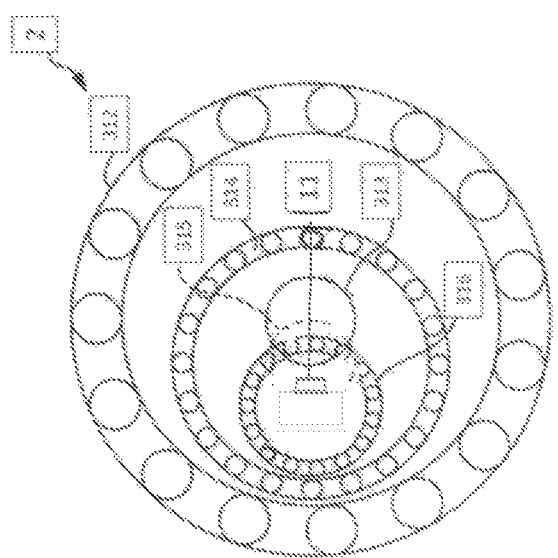

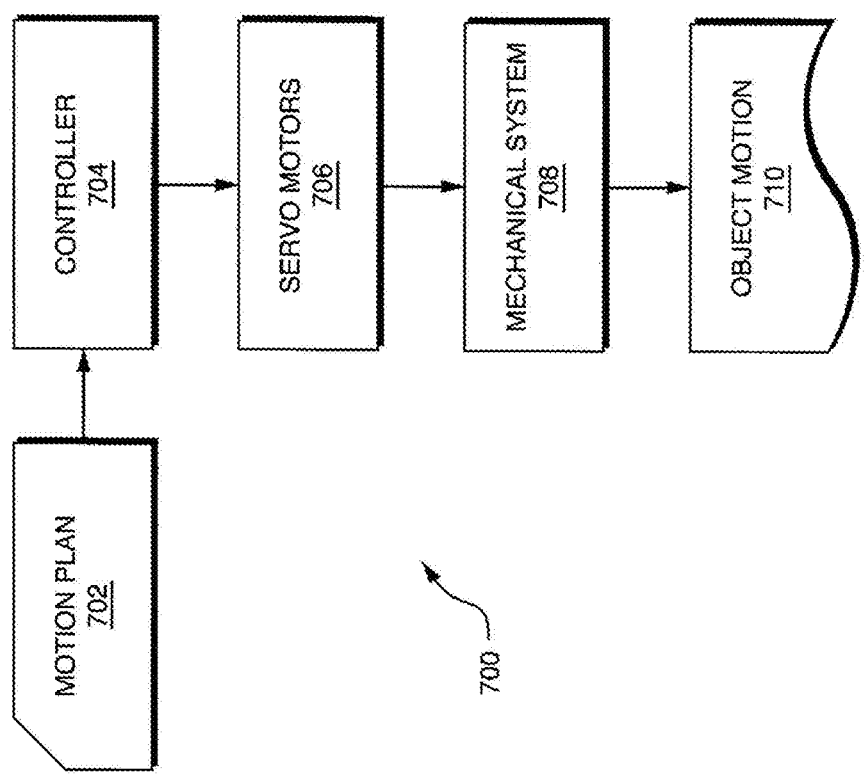

METHODS AND APPARATUS FOR PERFORMING MULTIPLE MANUFACTURING OPERATIONS ON AN OBJECT

CROSS-REFERENCE TO RELATED APPLICATION(S)

This application is a U.S. national stage filing under 35 U.S.C. § 371 of PCT/US2019/036508, filed Jun. 11, 2019 and entitled "Methods and Apparatus for Performing Multiple Manufacturing Operations on an Object." which claims the priority benefit, under 35 U.S.C. § 119 (e), of U.S. Application No. 62/683,921, filed on Jun. 12, 2018 and entitled "Mechanism for performing multiple manufacturing operations on an object," each of which is incorporated herein by reference in its entirety.

BACKGROUND

Typically, manufacturing a part, such as a bearing, involves multiple machining and/or manufacturing operations. Each operation is performed with a different tool, so the part is moved from machine to machine. When it is moved to a machine, the part is positioned precisely, usually by a machinist who operates the machine, so that the machine can perform the manufacturing operation precisely. When that operation is finished, the machinist removes the part from the tooling, such as shoes or a chuck, and moves it across the shop floor to the next machine, where the machinist positions the part in another tooling with respect to the next machine. This positioning and re-positioning process is costly and time consuming, especially for complicated parts. In addition, each machine requires its own precision positioning system, grinding spindle to rotate the grinding wheel at high speed, and grinding wheel dressing system and tooling.

For instance, consider a machined tapered roller bearing 100 like the one shown in FIG. 1. When assembled, the tapered roller bearing 100 has tapered rolling elements 106 held by a cage 108 between an outer ring 102, also called a cup or outer race, and an inner ring 104, also called a cone or inner race. To perform the precision grinding operations needed to manufacture the cone 104 of this tapered roller bearing 100, three separate grinding machines are required: one to grind the inside/inner diameter (ID), one to grind the outside/outer diameter (OD), and one to grind the rib. Similarly, three separate machines are used for precision grinding of fuel injectors for internal combustion engines: one to grind the inlet bore, one to grind the check valve seat, and one to grind the outlet bore.

SUMMARY

An inventive precision positioning and manufacturing system can perform many manufacturing operations on a single part without the need to adjust the part manually between operations. It also eliminates the need for separate precision positioning systems and grinding wheel dressing systems and tooling for multiple machines. Instead, it can use a single precision positioning system and a single grinding wheel dresser to carry out many different grinding operations. For instance, an inventive precision positioning and manufacturing system can perform three different grinding operations (e.g., grinding the ID, OD, and rib on of a tapered roller bearing) with three grinding wheels and just one precision positioning system, just one grinding wheel dressing systems, and just one set of tooling. This dramatically reduces cost of a capital equipment needed to produce the part. In addition to reducing capital costs, it also improves quality by performing all operations on the same tooling. And it reduces transport time and costs associated with making the part by eliminated the need to move the part among three different grinding machines.

A system for performing multiple manufacturing steps may include a workhead, a first tool, a second tool, and a positioning system supporting the workhead. In operation, the workhead hold a workpiece, the first tool performs a first machining operation on the workpiece, the second tool performs a second machining operation on the workpiece, and the positioning system moves the workhead and the workpiece linearly in a plane intersecting the first tool and the second tool. The positioning system also rotates the workhead and the workpiece about an axis perpendicular to the plane intersecting the first tool and the second tool.

The first and second tools can be first and second grinding wheels, respectively. The system may also include a grinding wheel dresser mounted on the positioning system. The positioning system moves the grinding wheel dresser within the plane intersecting the first grinding wheel and the second grinding wheel. And the grinding wheel dresser dresses the first grinding wheel and the second grinding wheel.

The positioning system can move the workpiece from the first tool to the second tool while the workpiece is on the workhead, which may rotate the workpiece about an axis of symmetry of the workpiece.

The axis perpendicular to the plane intersecting the first tool and the second tool may be a first axis. The positioning system may include first, second, and third rotary tables. In operation, the first rotary table rotates about the first axis. The second rotary table supports the first rotary table and rotates about a second axis parallel to the first axis and perpendicular to the plane intersecting the first tool and the second tool. And the third rotary table supports the second rotary table and rotates about a third axis parallel to the first axis and the second axis and perpendicular to the plane intersecting the first tool and the second tool.

Alternatively, the positioning system may include a rotary table, a first slide supporting the rotary table, and a second slide supporting the first slide. The rotary table rotates the workhead about the axis perpendicular to the plane intersecting the first tool and the second tool. The first slide moves the workhead and the rotary table in a first direction within the plane intersecting the first tool and the second tool. And the second slide moves the workhead, the rotary table, and the first slide in a second direction different than the first direction within the plane intersecting the first tool and the second tool.

The system may include a spindle, operably coupled to the first tool, to rotate the first tool with respect to the workpiece. It can also include a controller, operably coupled to the positioning system, to cause the positioning system to move the workpiece between the first tool and the second tool according to a motion plan. And it can include a slide, operably coupled to the first tool, to translate the first tool in the plane with respect to the workpiece.

A method for manufacturing a part from a workpiece includes securing the workpiece to a workhead. Once the workpiece has been secured, an eccentric positioning system moves the workpiece in the workhead to a first tool, which performs a first manufacturing operation on the workpiece while the workpiece is in the workhead. The eccentric positioning system moves the workpiece in the workhead from the first tool to a second tool (e.g., within under one minute), which performs a second manufacturing operation on the workpiece while the workpiece is in the workhead. For example, the first and second manufacturing operation may include grinding inner and outer diameters of a bearing or other part. After the second manufacturing operation has been completed, the workpiece can be removed from the workhead.

In some cases, a dresser (e.g., a rotary diamond dresser) mounted on the eccentric positioning system dresses the first tool. The eccentric positioning system moves the dresser from the first tool to the second tool, and the dresser dresses the second tool.

A multi-tool positioning and manufacturing system may also include a top plate, workhead, first spindle, second spindle, third spindle, and eccentric positioning system. The workhead supports a workpiece in a plane parallel to the top plate. The first, second, and thirds spindles, which are supported by the top plate, spin first, second, and third grinding wheels, respectively, in the plane parallel to the top plate. And the eccentric positioning system, which supports the workhead and the grinding wheel dresser, moves the workhead and the workpiece in the plane parallel from the first grinding wheel to the second grinding wheel to the third grinding wheel.

The workhead can spin the workpiece about an axis of symmetry of the workpiece.

The eccentric positioning system can move the workhead laterally within the plane parallel to the top plate and to spin the workhead about an axis perpendicular to the plane parallel to the top plate.

Such as a multi-tool positioning and manufacturing system may also include first and second slides mounted to the top plate. The first slide supports the first and second spindles and translate them linearly in the plane parallel to the top plate. And the second slide supports the third spindle and moves it linearly in the plane parallel to the top plate.

The multi-tool positioning and manufacturing system can also include a grinding wheel dresser mounted on the eccentric positioning system. The eccentric positioning system moves the grinding wheel dresser within the plane parallel to the top plate. And the dresser dresses the first grinding wheel, the second grinding wheel, and the third grinding wheel.

The eccentric positioning system may include first, second, and third rotary tables. The first rotary table has a first axis of rotation. The second rotary table is mounted on the first rotary table and has a second axis of rotation parallel to the first axis of rotation. And the third rotary table is mounted on the second rotary table and has a third axis of rotation parallel to the first axis of rotation and the second axis of rotation.

In one embodiment, a system uses eccentric rotary motion to position an object with three degrees of freedom that provides linear motion in a plane and rotation of the item about an axis perpendicular to that plane. In this embodiment all tools are in fixed positions.

In another embodiment, a system uses eccentric rotary motion to position an object with three degrees of freedom that provides linear motion in a plane and rotation of the item about an axis perpendicular to that plane. In this embodiment one or more tools can be moved along one or more linear axes of motion in the direction(s) of interest.

In yet another embodiment, a system uses two linear position systems that are located at right angles to each other and a rotary table to position an object with 3 degrees of freedom that provides linear motion in a plane and rotation of the item about an axis perpendicular to that plane. In this embodiment all tools are in fixed positions.

In still another embodiment, a system uses two linear position systems that are located at right angles to each other and a rotary table to position an object with 3 degrees of freedom that provides linear motion in a plane and rotation of the object about an axis perpendicular to that plane. In this embodiment one or more tools can be moved along one or more linear axes of motion in the direction(s) of interest.

BRIEF DESCRIPTION OF THE DRAWINGS

Other objects, features, and advantages will occur to those skilled in the art from the following description of the preferred embodiments of the invention and the accompanying drawings, in which:

FIG. 3B is a simplified top view of the bearings of a three-rotation eccentric positioning system suitable for positioning and re-positioning a workpiece on a workhead in a multi-tool precision positioning and manufacturing system.

FIG. 4 shows a flow chart for manufacturing a part using the multi-tool precision positioning and manufacturing system of FIG. 2.

DETAILED DESCRIPTION

Figure 1:
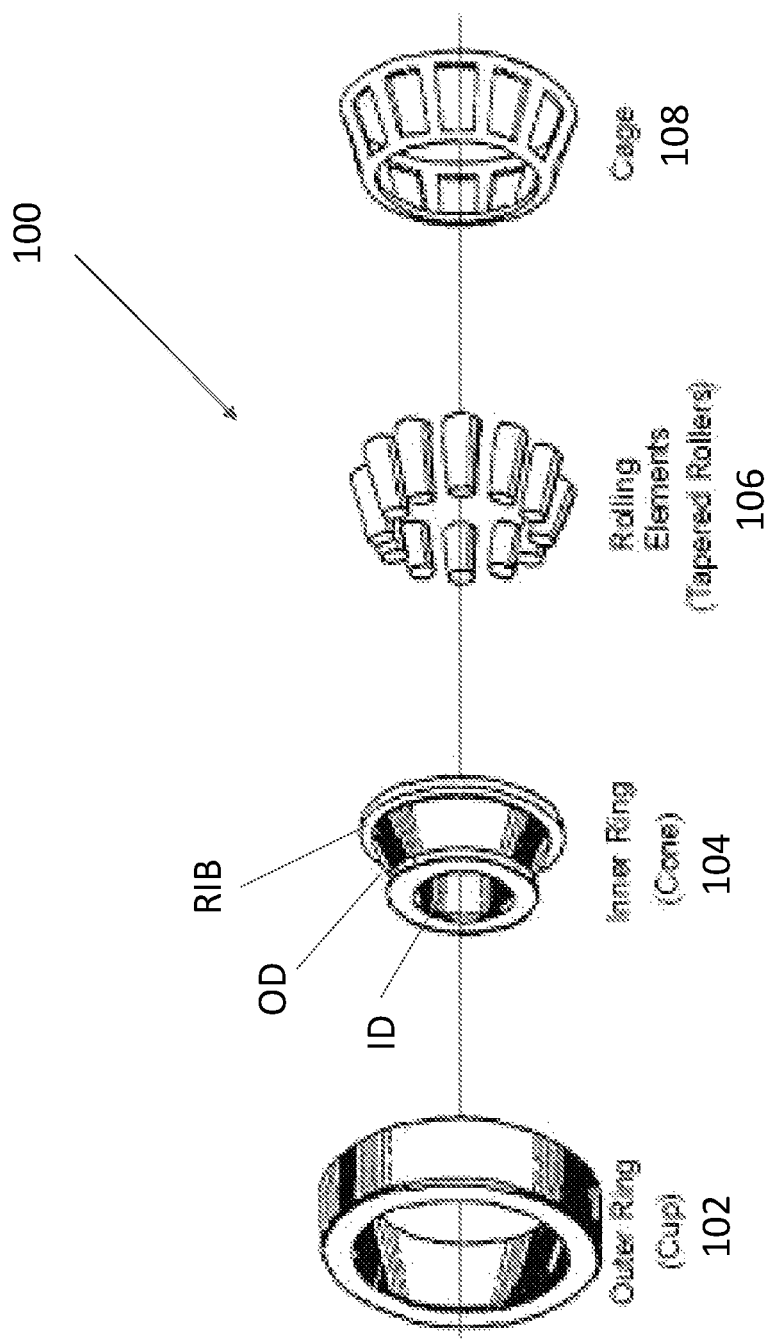
FIG. 1 shows an exploded view of a tapered roller bearing whose cone (inner race) is made using three separate grinding operations: (1) grinding the inner diameter (ID), (2) grinding the outer diameter (OD), and (3) grinding the rib.

A multi-tool precision positioning and manufacturing system can do multiple manufacturing operations on a single part. For example, it can grind the inner and outer diameters of a ball bearing's inner and outer rings; the inner diameter, outer diameter, and rib of a tapered roller bearing inner ring; or the three grinding operations for making a fuel injector. Moreover, it can perform sequential operations without any need to manually align or position the part between operations. Its precision positioning system moves the part from tool to tool with a precision of 0.05 microns in less than 60 seconds (e.g., less 30 seconds, less than 15 seconds, less than 10 seconds, less than 5 seconds, less than 1 second, or even less than 0.5 seconds). If each manufacturing operation takes about 10 seconds, then the total time to perform three operations is less than 31 seconds. In contrast, it can take several minutes just to transfer a workpiece from one grinding machine to another grinding machine, which is longer than it would take to perform all of the grinding operations with a multi-tool precision positioning and manufacturing system.

Replacing many tools with a single multi-tool precision positioning and manufacturing system offers other advantages as well. To start, a single multi-tool precision positioning and manufacturing system has a higher yield than two or more separate tools because the part isn't moved from tooling to tooling or machine to machine, reducing the opportunities for misalignment. For example, when using a multi-tool precision positioning and manufacturing system to perform three grinding operations, a machinist places the part in a shoe just once, giving only one chance for misalignment of the part with respect to the shoe. When performing three grinding operations with three separate grinding machines, the machinist must put the part in three separate shoes, there are three chances to misalign the part with respect to a shoe. If misalignment occurs during any one of these chances, the part could be ruined.

Using a single multi-tool precision positioning and manufacturing system instead of multiple tools also reduces energy consumption. The system and tools each consume about the same amount of baseline idle current, so replacing conventional tools with a smaller number of multi-tool precision positioning and manufacturing systems reduces total baseline current consumption. In addition, a single multi-tool precision positioning and manufacturing system consumes less electrical power in moving and positioning a workpiece than the total electrical power consumed by separate machines for moving and positioning a workpiece.

In addition, a single multi-tool precision positioning and manufacturing system is more compact than the tools that it replaces. As a result, it can be used in a smaller machine shop or the machine shop can be made smaller. This translates to lower construction costs, lower rent, lower heating and cooling costs, etc., for the manufacturing facility. And it uses fewer components—e.g., a single controller versus one controller per tool, a single dressing system versus one dressing system per tool, and so on—so it can be less expensive that the tools that it replaces. All of this means that a multi-tool precision positioning and manufacturing system can be less expensive to buy and operate than the tools that it replaces.

Multi-Tool Positioning and Manufacturing System with Eccentric Positioning

Figure 2:
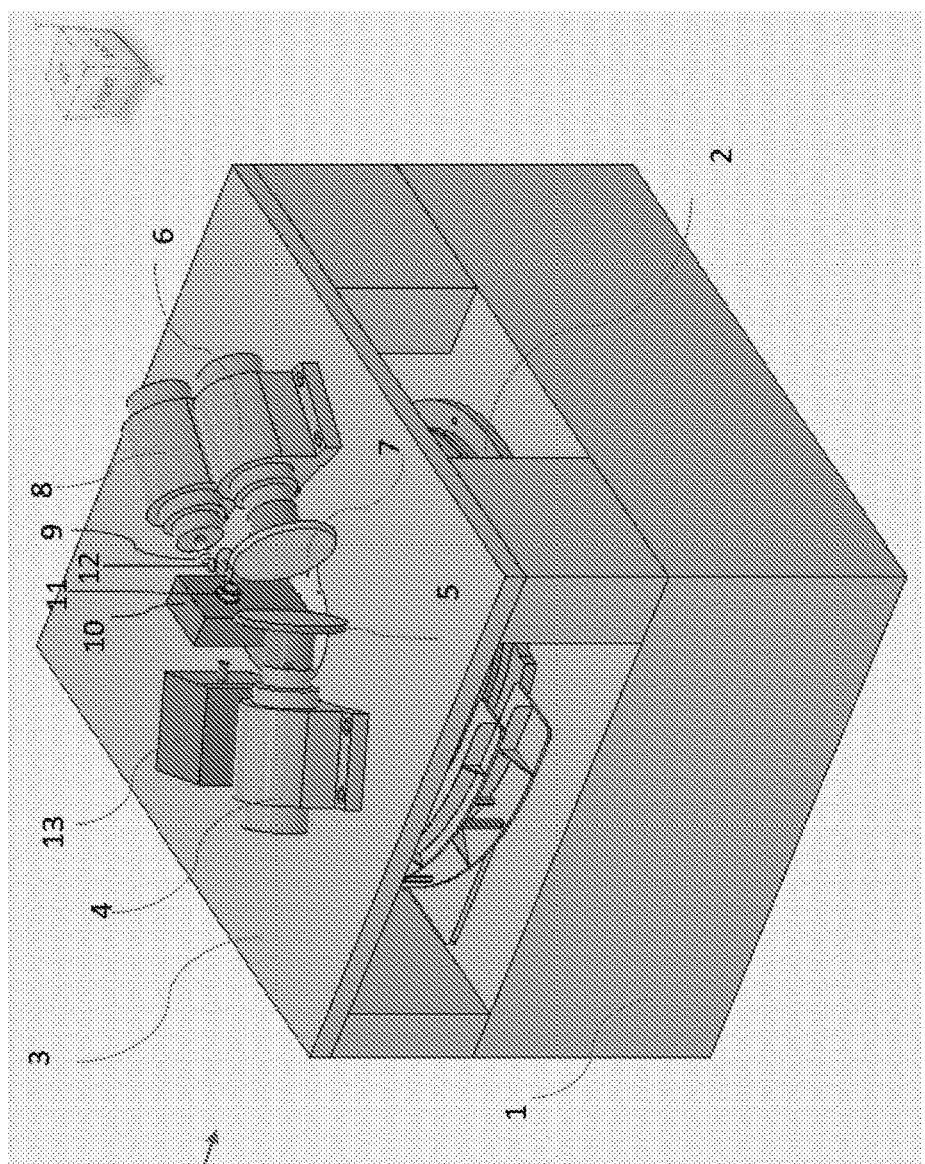
FIG. 2 shows a multi-tool precision positioning and manufacturing system that includes stationary tools and uses eccentric rotary motion to position an object, such as a workpiece supported by tooling, which is rotated by a workhead, with three degrees of freedom in a plane containing the stationary tools.

FIG. 2 shows a multi-tool positioning and manufacturing system 200 with an eccentric positioning system 2. The system 200 includes a base 1 that contains and protects the eccentric positioning system 2. The base 1 also supports a top plate 3, which in turn supports two or more tools. In this example, the top plate 3 supports a first tool 5 mounted on a first motorized grinding spindle 4, a second tool 7 mounted on a second motorized grinding spindle 6, a third tool 9 mounted on a third motorized grinding spindle 8, and a non-rotating turning tool 13. The first tool 5, second tool 7, third tool 9, and non-rotating turning tool 13 all intersect a plane parallel to the top plate 3.

The top plate 3 also defines a hole or aperture for access to the eccentric positioning system 2. A workhead 10 mounted to the eccentric positioning system 2 or the top of the eccentric positioning system 2 protrudes through this hole, allowing the eccentric positioning system 2 to move the workhead 10 with respect to the components mounted to the top plate 3. The workhead 10 locates, supports, and rotates a workpiece 11, such as the inner race of a tapered roller bearing made of hardened steel, about its axis of symmetry in the same plane that intersects first tool 5, second tool 7, third tool 9, and non-rotating turning tool 13 and is parallel to the top plate 3. The eccentric positioning system 2 also supports and moves a rotary diamond dresser 12 in this plane for dressing and/or shaping the grinding wheels 5, 7, and 9 shown in FIG. 2 as explained below.

The workpiece 11 may be secured to the workhead 10 with tooling, such as shoes or a chuck. In operation, the workhead 10 can rotate the chuck or a (magnetic) backing plate, which in turn rotates the workpiece 11. It typically takes 30-60 minutes to install the tooling (e.g., the shoes and backing plate) on the workhead 10. Once the tooling has been installed properly, the workpiece 11 (e.g., a part to be ground) can be secured to the tooling by the machine operator, robot, or dedicated workpiece loading and unloading mechanism. The machine operator, robot, or dedicated workpiece loading and unloading mechanism can also remove any part that has just been ground. The length of time it takes to replace a ground part with an unground ("black") part depends on the size of the part, tooling type (e.g., three jaw chuck, magnetic chuck, or shoe tooling), and loading system (e.g., manual, dedicated electro-mechanical system, or general-purpose robot) and take from 1 second to 20 minutes.

In operation, the eccentric positioning system 2 positions the workpiece 11 and the workhead 10 with three degrees of freedom in a plane parallel to the base 1. That is, the eccentric positioning system 2 can move the workpiece 11 linearly within that plane (two-dimensional translational motion) and rotate the workpiece 11 about an axis perpendicular to that plane (one-dimensional rotational motion). The eccentric positioning system 2 moves the workpiece 11 (and the workhead 10) to a particular tool, holds the workpiece 11 in place as the tool removes material from the workpiece 11, then moves the workpiece to the next tool automatically. The workpiece 11 remains on the workhead 10 during all of the operations performed by the tools, eliminating any need for manual repositioning between operations by different tools.

Consider, for example, making a tapered roller bearing cone with the multi-tool positioning and manufacturing system 200 in FIG. 2. First, a machinist secures the workpiece 11 to the workhead 10. Then the eccentric positioning system 2 moves the workpiece 11 to the first grinding wheel 5. The first motorized grinding spindle 4 rotates the first grinding wheel 5 to create the rib surface of tapered roller bearing cone. Once the first grinding wheel 5 has finished grinding the rib surface, the first motorized grinding spindle 4 stops rotating, and the eccentric positioning system 2 moves the workpiece 11 to the second grinding wheel 7, which is spun by the second motorized grinding spindle 6 to grind the outer race of tapered roller bearing cone. And once the second grinding wheel 7 has finished grinding the outer race surface, the second motorized grinding spindle 6 stops rotating, and the eccentric positioning system 2 moves the workpiece 11 to the third grinding wheel 9, which is spun by the third motorized grinding spindle 8 to grind the inside diameter of the tapered roller bearing cone. The third motorized grinding spindle 8 stops rotating once the inside diameter has been ground. Then the eccentric positioning system 2 moves the workpiece 11 to the non-rotating turning tool 13, which removes material from both the inside diameter and outside diameter raceway of the workpiece 11. (The operation performed by the non-rotating turning tool 13 could be considered a super finishing or honing operation.) Finally, the machinist removes the workpiece 11 from the workhead 10.

A multi-tool positioning and manufacturing system can have other tools and perform other operations as well. For example, the tools may not rotate or spin, nor do they have to be mounted on motorized grinding spindles. For example, many operations performed by a lathe, e.g., drilling, countersinking, counterboring, or chamfering, could be performed by mounting the tool in a stationary chuck. The workpiece can be rotated with respect to the tool or the tool and chuck can be mounted on the top plate as mentioned below. One or more of these lathe operations can be carried out on a complex part before or after one or more grinding steps. Other suitable tools include lasers for hole drilling, milling cutters, and single- and multi-point turning (lathe) tools. At one extreme, a multi-tool positioning and manufacturing system duplicates the functions of a three-axis horizontal computer numerical control (CNC) milling machine combined with a grinding system.

The eccentric positioning system 2 also positions the rotary diamond dresser 12 to dress or shape the grinding wheels 5,7 and 9 shown in FIG. 2. The rotary diamond dresser 12 removes metal, dull and misshapen grains, and bonding material from the grinding material on the grinding surfaces of the grinding wheels 5,7 and 9. This sharpens the grinding wheel. The rotary diamond dresser 12 may also return the grinding surfaces to their original shapes. And it can remove material from a grinding surface so that the resultant grinding surface runs true to some other surface.

Because the rotary diamond dresser 12 is mounted on the eccentric positioning system 2, it can dress all three grinding wheels 5,7 and 9, eliminating the need for a separate dresser for each wheel. Thus, the multi-tool positioning and manufacturing system 200 can carry out four machining operations and three dressing operations to be accomplished with one eccentric positioning system, reducing cost and increasing productivity and improving manufacturing accuracy.

Eccentric Positioning Systems

Figure 3A:
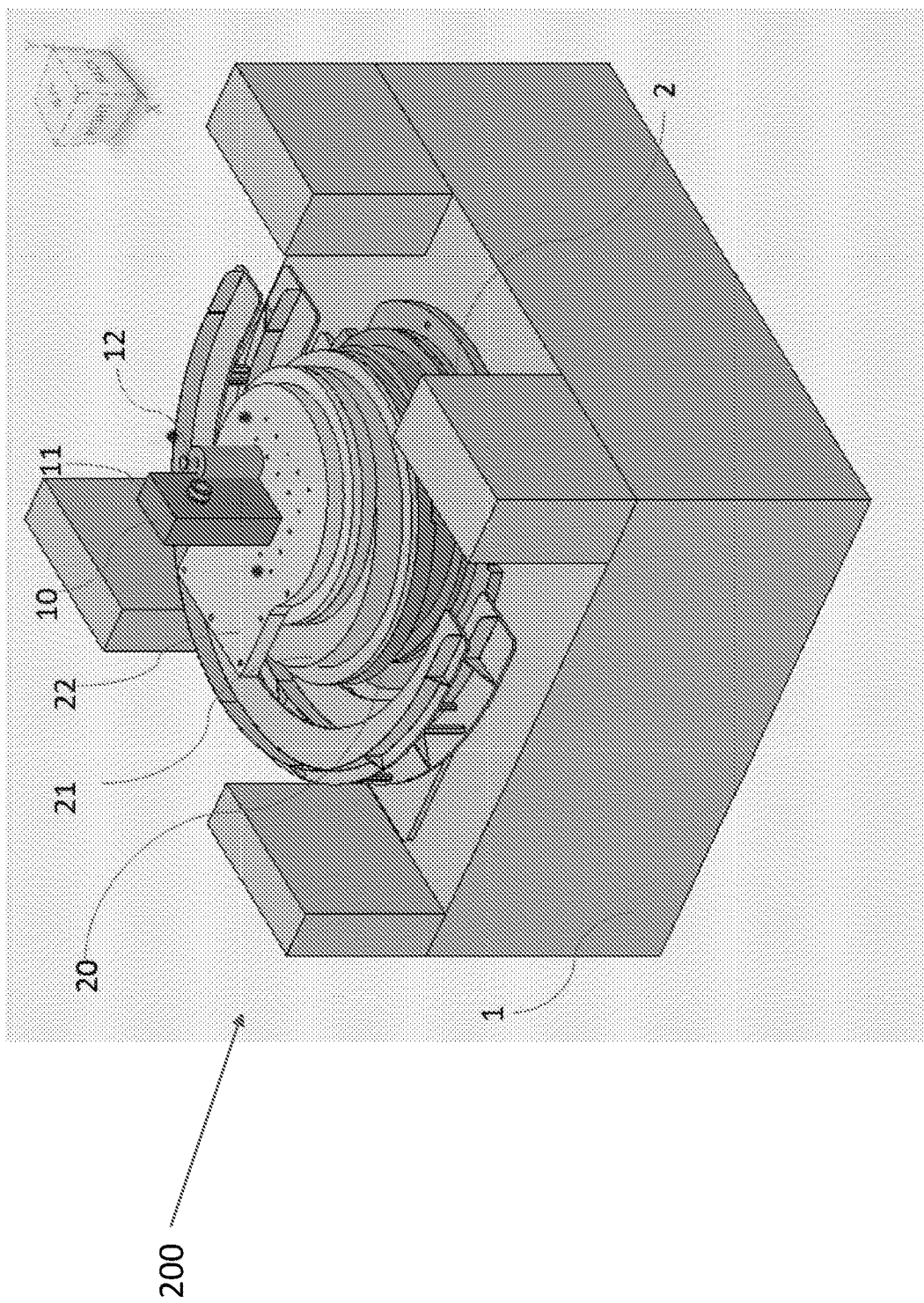
FIG. 3A is a perspective view of an eccentric positioning system suitable for moving the object in the multi-tool precision positioning and manufacturing system of FIG. 2.

FIG. 3A is a cutaway view of the multi-tool positioning and manufacturing system 200 with components 3 through 9 and 13 omitted to show the eccentric positioning system 2 in greater detail. The eccentric positioning system 2 is comprised of three circular eccentric rotary tables 20, 21, and 22. The workhead 10 and the rotary diamond dresser 12 are mounted on the top eccentric rotary table 22, which is mounted on the middle eccentric rotary table 21, which in turn is mounted on the bottom eccentric rotary table 20. The eccentric rotary tables 20-22 are not concentric when viewed from above or below. Instead, the eccentric rotary tables 20-22 rotate about different, parallel axes. This enables the eccentric positioning system 2 to translate the workhead 10, workpiece 11, and rotary diamond dresser 12 in any direction in the plane perpendicular to these rotational axes. The eccentric positioning system 2 can also rotate the workhead 10, workpiece 11, and rotary diamond dresser 12 about an axis parallel to or coincident with any one of the rotational axes of the eccentric rotary tables 20-22.

The eccentric positioning system 2 can be controlled by a computerized control system (not shown). This control system is used to control the position, angle of rotation, and linear and rotary velocities and accelerations of the top eccentric rotary table 22. It may be programmed with a motion plan that sets the trajectory of the workpiece 11 as described in greater detail below.

FIG. 3B is a simplified top view of three nested bearings of the eccentric positioning system 2. A largest, outer bearing 312 encompasses a mid-size bearing 314 and a smallest, inner bearing 316. The bearings are eccentrically mounted such that they each can rotate about a different but parallel axis as described above; as the rotations take place, these axes may become temporarily coincidental. The bearings are supported such that when the inner race of the outer bearing 312 is rotated, the other bearings 314 and 316 (and any structures or objects supported by such bearings) also move about the axis of rotation of the outer bearing 312. Similarly, when the inner race of the middle bearing 314 is rotated, the inner bearing 316 (and any structures or objects supported by the inner bearing 316) move as well. The workpiece 11 is directly or indirectly coupled to the inner race of the inner bearing 316 via the workhead 10 and moves with the inner race of the inner bearing 316.

A solid circle 313 shows the path of the center of the mid-sized bearing 314 when the outer bearing 312 rotates. A dashed circle 315 shows the path of the center of the inner bearing 316 when the mid-sized bearing 314 rotates. The outer bearing 312 and/or mid-sized bearing 314 control the motion of the workpiece 11 in the X-Z plane, which is parallel to the drawing page. The workpiece 11 is coupled to the inner bearing 316 such that the workpiece 11 is rotated about the axis of rotation of the inner bearing 316. The inner bearing 316 thus controls the angular orientation (theta) of the workpiece 11 in the XZ plane. As is evident from this drawing, the inner bearing 316 has an effect on the X and Z position as well as the angular orientation.

Figure 3C:
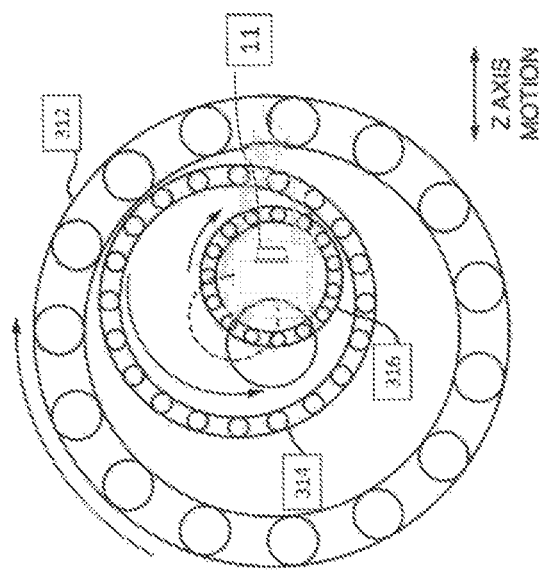
FIGS. 3C and 3D illustrate how a three-rotation eccentric positioning system can move an object, such as a workpiece on a workhead, about fourteen inches in a generally straight line from the position shown in FIG. 3C to the position shown in FIG. 3D.
Figure 3D:
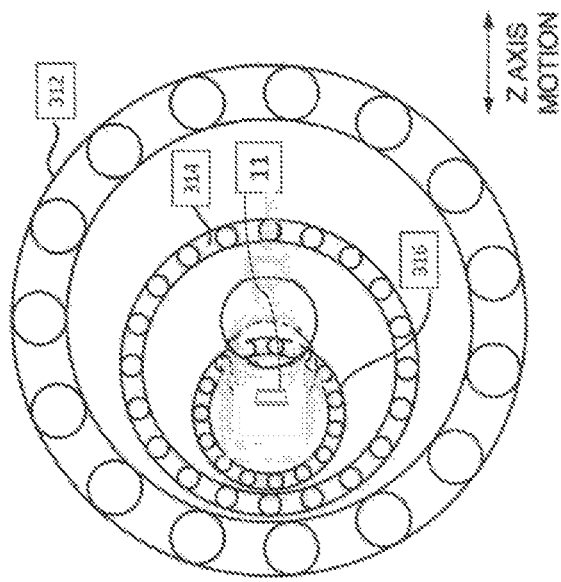

FIGS. 3C and 3D illustrate one example of the direction and extent in degrees of rotary motion of the bearings 312, 314, and 316 that move the workpiece 11 in a generally straight line along the "Z" axis, from the start position shown in FIG. 3C to the end position shown in FIG. 3D. The workpiece 11 has the same angular orientation at the start and end of this motion, as shown in FIGS. 3C and 3D. The motions can take place simultaneously or sequentially and are controlled appropriately by the system controller. In situations in which the path of motion is important, e.g., to avoid hitting another object with the workpiece 11, straight-line or other purposeful, directed object motion can be accomplished.

In this example, the outer bearing 312 has an OD of 43 inches and an ID of 33.75 inches. The mid-sized bearing 314 has an OD of 25 inches and an ID of 21.25 inches. And the inner bearing 316 has an OD of 12.75 inches and an ID of 10 inches. The motions include clockwise motion of large bearing 312 amounting to 138.7 degrees, counterclockwise motion of mid-size bearing 314 of 277.2 degrees, and clockwise motion of smallest bearing 316 of 138.5 degrees. With these dimensions and rotations, the workpiece moves about 13.93 inches in the Z dimension.

Figure 3F:
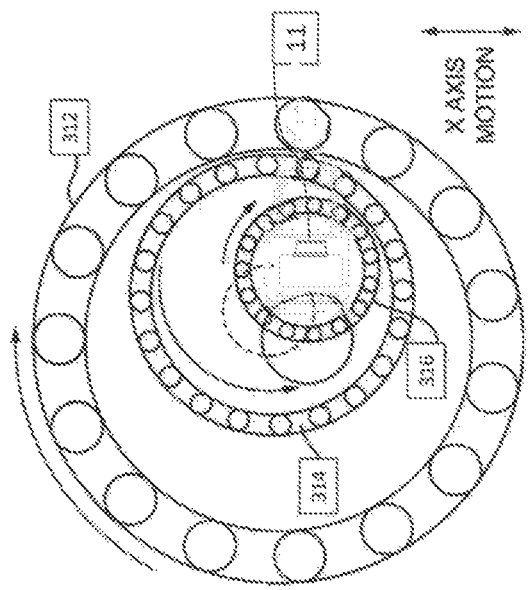
FIGS. 3E and 3F illustrate how a three-rotation eccentric positioning system can move an object, such as a workpiece on a workhead, from the position shown in FIG. 3E (which is the same as that shown in FIG. 3D), in the "X" direction to the position shown in FIG. 3F.
Figure 3E:
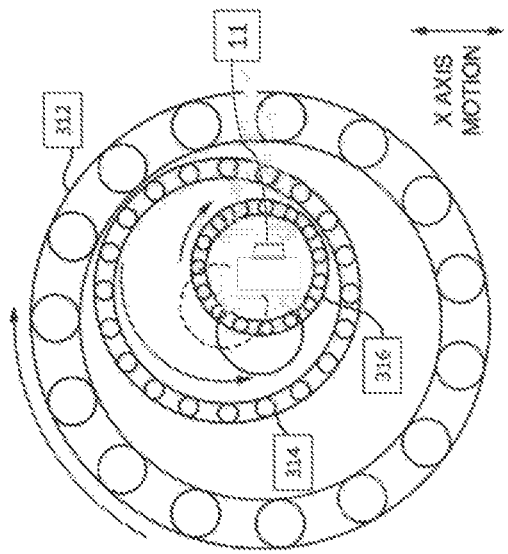

FIGS. 3E and 3F illustrate motions that move the workpiece 11 in the X direction. In this case, the workpiece 11 translates from the starting position shown in FIG. 3E, which is the same as that shown in FIG. 3D, to the position shown in FIG. 3F. The total (absolute) rotational motion of the inner races of bearings 312, 314 and 316, respectively, are: clockwise 173.5 degrees, counterclockwise 294 degrees, and clockwise 120.4 degrees. For the bearing dimensions given above, this equates to line motion of 2.88 inches in the "X" direction.

To maintain single-axis linear motion, the overall positioning can take place in two steps: e.g., the Z axis motion shown in FIGS. 3C and 3D, and then the X axis motion shown in FIGS. 3E and 3F, in either order. The eccentric positioning system 2 is not constrained to moving the workpiece 11 along a single axis or even in a straight line; it can move the workpiece along curved or bent paths with the plane as well.

For more information on the eccentric positioning system 2, see U.S. Pat. No. 7,803,034, which is incorporated herein by reference in its entirety.

Workpiece Motion Control

FIG. 4 illustrates a control system 700 for the eccentric positioning system 2. The control system 700 includes a controller 704, such as a Rockwell, ACS, Siemens or FANUC controller that executes appropriate motion control software. The controller 704 is coupled to servo motors 706 in the eccentric positioning system 2. These servo motors 706 are in turned coupled to the eccentric positioning system's mechanical system 708.

The control system 700 can be used to control motion of the workpiece 11 or the grinding wheel dresser 12 depending on whether the current operation is modifying the workpiece 11 or shaping the grinding wheels 5, 7 and 9. The controller 704 moves the workpiece 11 or grinding wheel dresser 12 according to a motion plan 702, which comprises motion control parameters input by the operator specific to the workpiece 11. The motion control parameters in the motion plan 702 are selected so that the positioning system 2 moves the workpiece 11 from tool to tool and keeps the workpiece 11 in place for each machining operation. The controller 704 uses these motion control parameters to generate and send appropriate control signals to the servo motors 706, which interact with the mechanical system 708 to cause object motion 710.

Multi-Tool Positioning and Manufacturing System with Moving Slides

Figure 5:
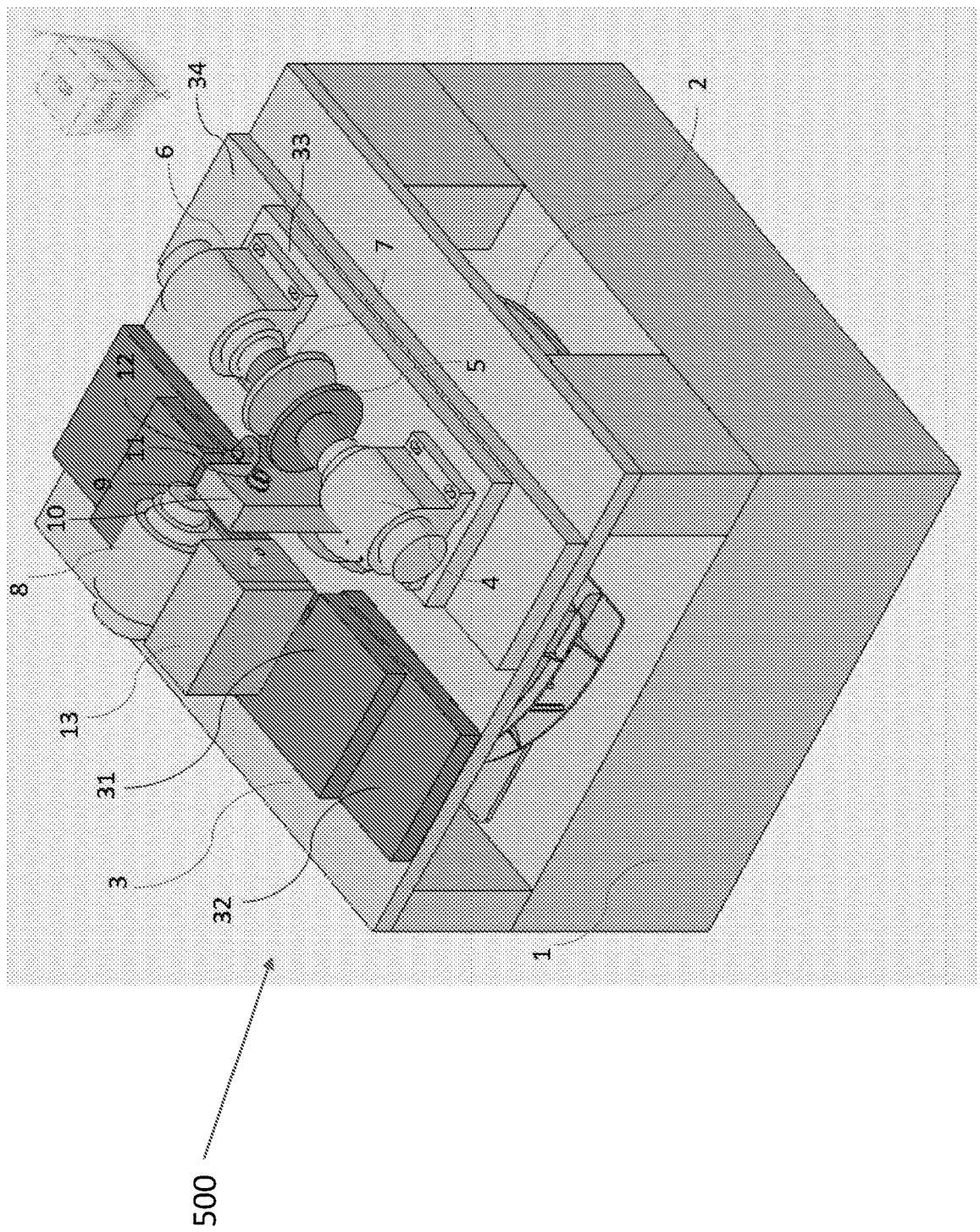
FIG. 5 shows a multi-tool precision positioning and manufacturing system with the workhead mounted to an eccentric positioning system and tools mounted to linear slides.

FIG. 5 shows a multi-tool positioning and manufacturing system 500 with moving slides for the tools. Again, the eccentric positioning system 2 positions the workpiece 11 with three degrees of freedom (two linear degrees of freedom and one rotational degree of freedom) in a plane parallel to the top plate 3. The first motorized grinding spindle 4 and second motorized grinding spindle 6 are mounted on a first sliding table 33, which is on a first base 34 mounted to the top plate 3. And the third motorized grinding spindle 8 and non-rotating turning tool 13 are mounted a second sliding table 31, which is on a second base 32 mounted to the top plate 3.

The slides 31 and 33 can move the spindles in the X direction independent of the workpiece 11 and rotary diamond dresser 12 and can be controlled by the same controller (e.g., controller 704 in FIG. 4) that controls the eccentric positioning system 2. (In this example, the first slide 33 moves the first motorized grinding spindle 4 and second motorized grinding spindle 6 together, i.e., as a single unit.) The slides 31 and 33 can be used to position tools that are beyond the range of the eccentric positioning system, such as a bearing for a gas turbine engine which might be several feet in diameter. There is no practical limit to the length of the slide, so a single long slide could support several spindles. The slide could move these spindles back and forth to roughly align the workpiece with the workhead before the positioning system performs the fine positioning for grinding.

The slides 31 and 33 can also be mounted differently to move in different directions and/or modified to move in additional directions. For example, either slide could be rotated by 90° to move the corresponding tool in the Z direction. This is just an example; other slide orientations (e.g., 30°, 45°, 60°, and so on) are also possible. Similarly, either slide may move the corresponding tool(s) in the Y direction, toward or away from the top plate 3. A slide made also move laterally in two dimensions (e.g., the X and Z directions). Y motion is particular useful in applications where the workpiece 11 did not have an axis of symmetry, flat surface grinding, and gear tooth grinding to accommodate different diameter gears.

Multi-Tool Positioning and Manufacturing System with Rotary and Linear Motion

Figure 6:
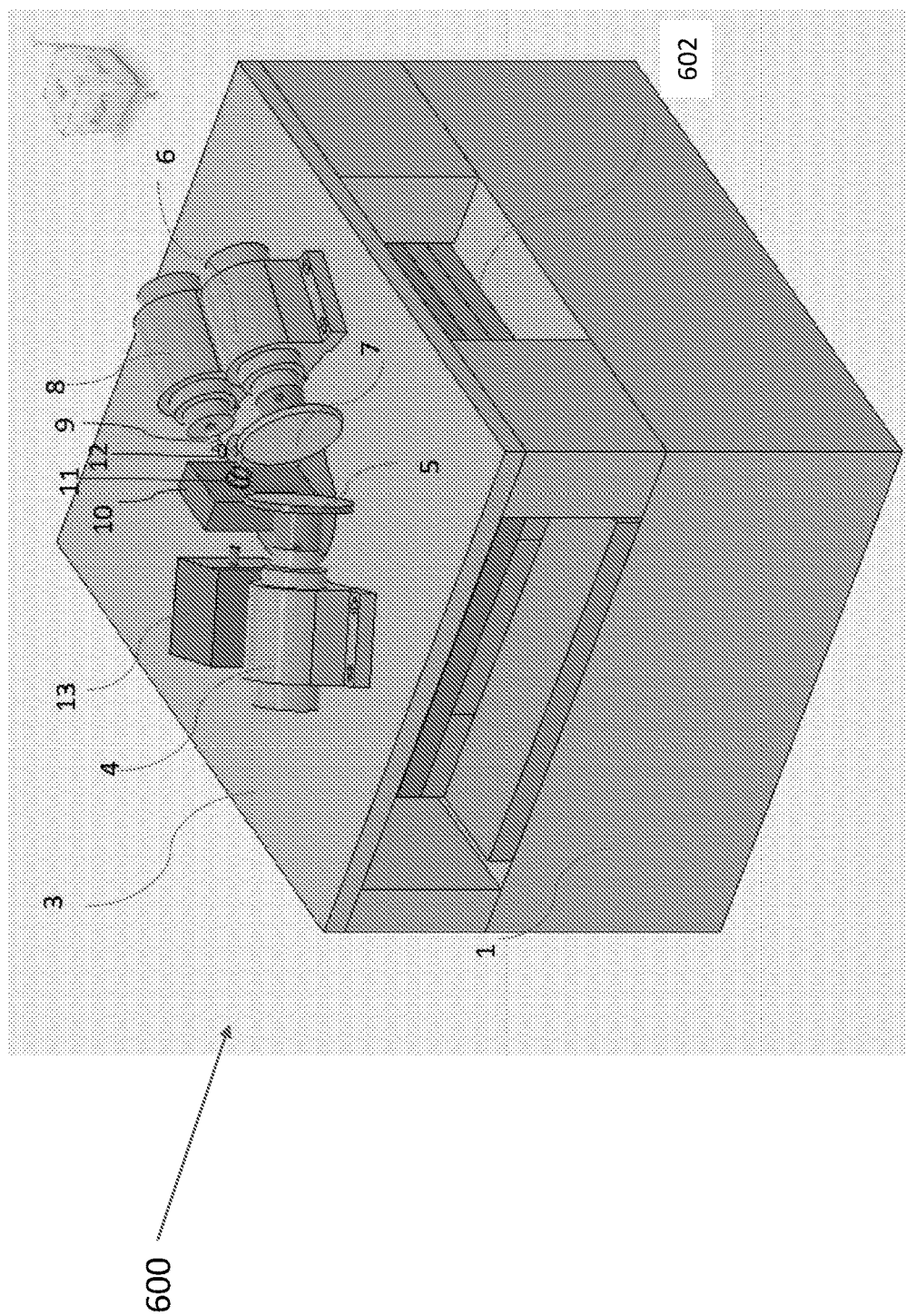
FIG. 6 shows a multi-tool precision positioning and manufacturing system with stationary tools and linear X and Z slides and a rotary table to position an object, such as a workpiece on a workhead, with three degrees of freedom in a plane containing the stationary tools.
Figure 7:
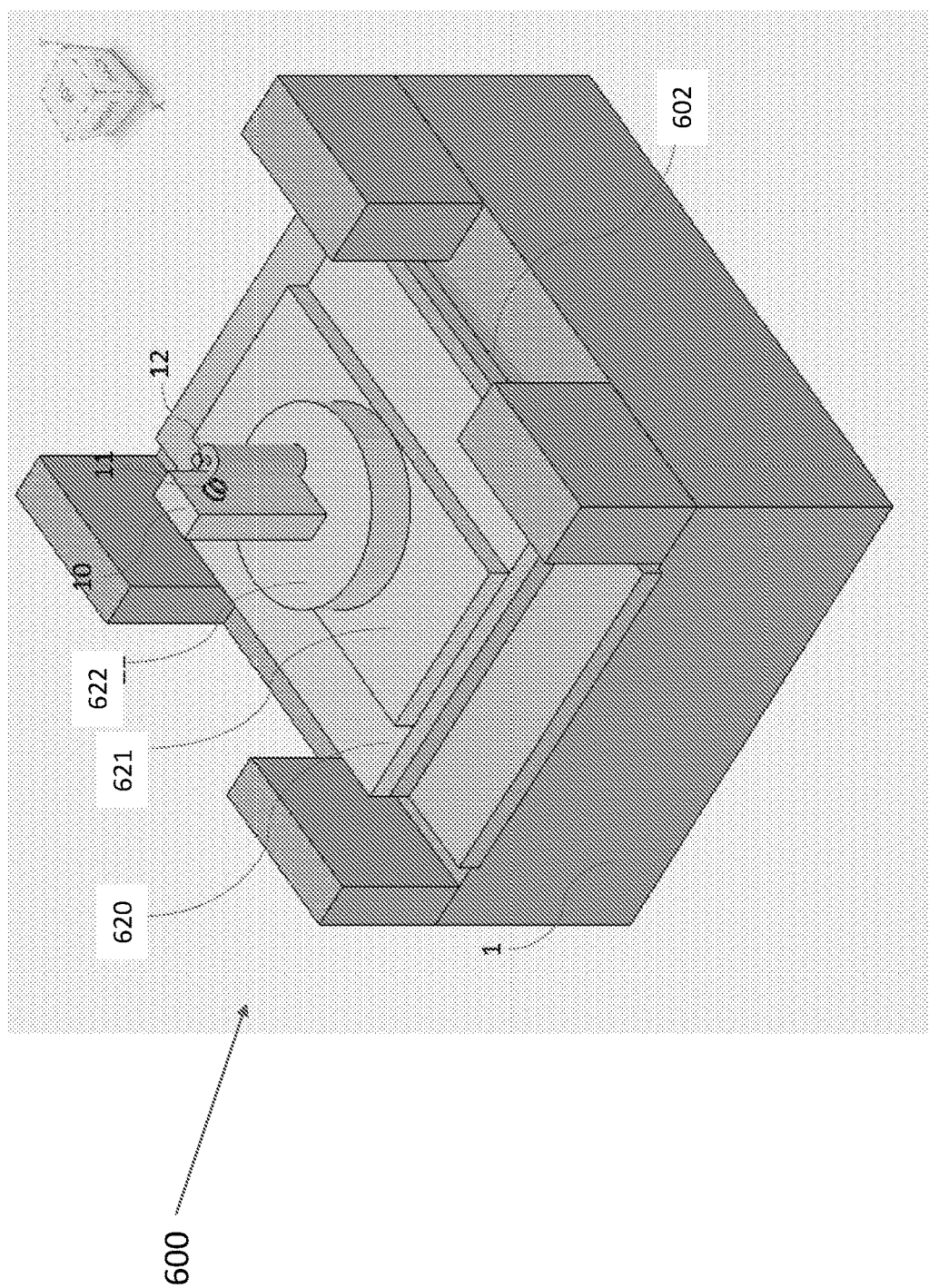
FIG. 7 shows the linear X and Z slides and rotary table of FIG. 6.

FIGS. 6 and 7 show a multi-tool positioning and manufacturing system 600 with a rotary and linear positioning system 602 instead of an eccentric positioning system. The rotary and linear positioning system 602 includes a rotary table 622, Z linear slide 621, and X linear slide 620 that sit inside the base 1 and are covered by the top plate 3. The top plate 3 supports the spindles 4, 6, and 8 and turning tool 13. The workhead 10 and rotary diamond dresser 12 are mounted on the rotary table 622 and protrude through a hole in the top plate 3 (or at least a portion of the rotary table 622 protrudes through the hole in the top plate 3).

Together, the rotary table 622, Z linear slide 621, and X linear slide 620 move the workhead 10 (and the workpiece 11, which is on the workhead 10) and the rotary diamond dresser 12 within a plane parallel to the top of the top plate 3. The X linear slide 620 and Z linear slide 621 move the workhead 10, workpiece 11, and rotary diamond dresser 12 in the X and Z directions, respectively. The rotary table 622 rotates the workhead 10, workpiece 11, and rotary diamond dresser 12 about an axis that extends in the Y direction. This rotational axis can be repositioned by moving the rotary table 622 using the X linear slide 620 and Z linear slide 621.

The X linear slide 620, Z linear slide 621, and rotary table 622 can move simultaneously, sequentially, and independently according to a motion plan executed by a suitably programmed control system (e.g., control system 700 in FIG. 4). This control system is used to control the position, angle of rotation and linear and rotary velocity and acceleration of the rotary table 622 to which the workhead 10 and the rotary diamond dresser 12 are mounted. As explained above, the rotary diamond dresser 12 is used to dress or shape the grinding wheels 5, 7 and 9. And the workhead 10 locates, supports, and rotates the workpiece 11 about its axis of symmetry.

For example, consider the workpiece 11 may be the inner race of a tapered roller bearing made of hardened steel. The workhead 10 is used to locate, support, and rotate the inner race about its axis of symmetry. The rotary and linear positioning system 602 moves the inner race to the first motorized grinding spindle 4, which rotates the first grinding wheel 5 to grind the rib surface of the inner race. Then the rotary and linear positioning system 602 moves the inner race to the second motorized grinding spindle 6, which rotates the second grinding wheel 7 to grind the outer diameter of the inner race. The rotary and linear positioning system 602 then moves the inner race to the third motorized grinding spindle 8, which rotates the third grinding wheel 9 to grind the inside diameter of the inner race. Finally, the rotary and linear positioning system 602 moves the inner race to the non-rotating turning tool 13, which removes material from both the inside diameter and outside diameter of the inner race.

Figure 8:
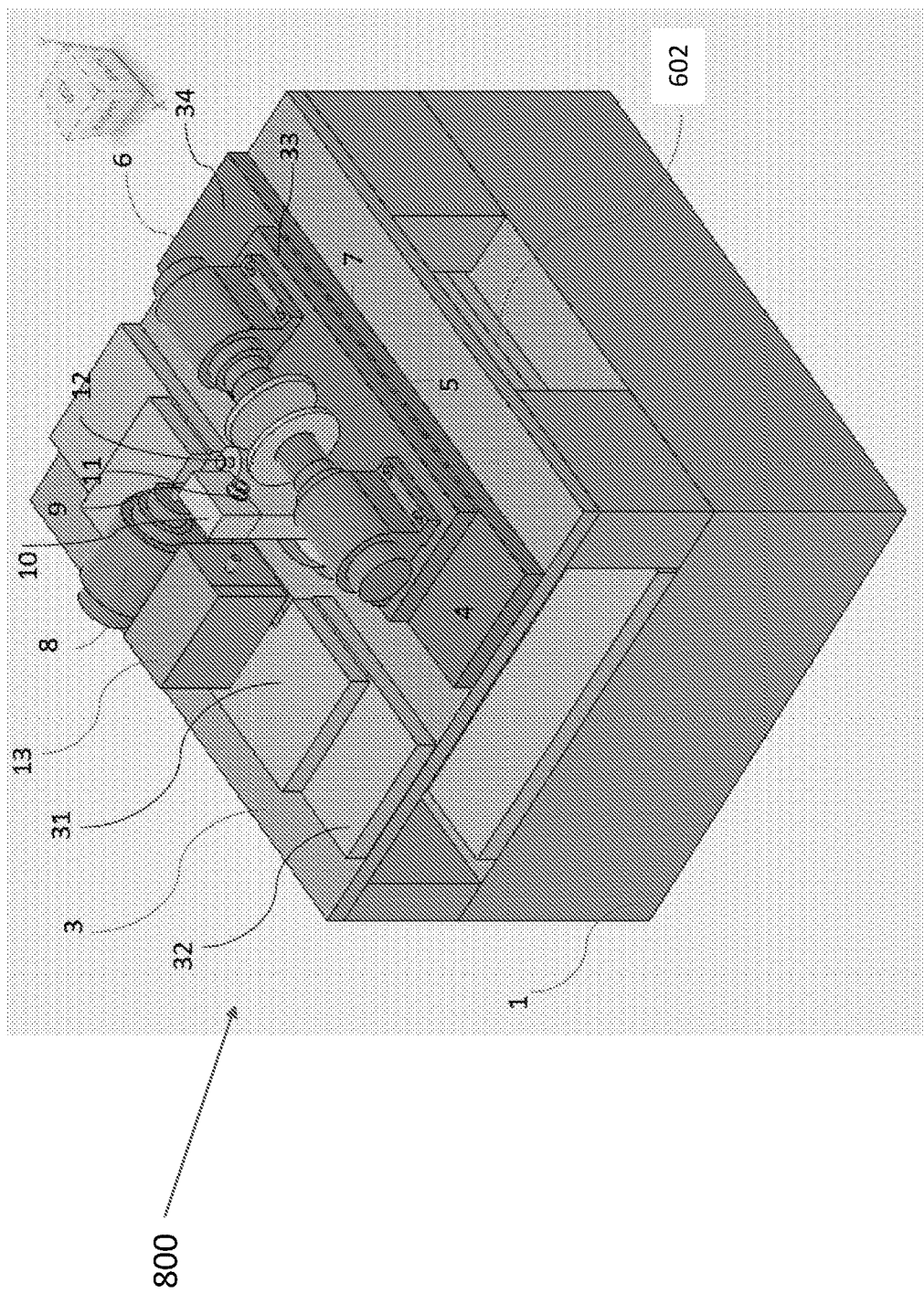
FIG. 8 shows a multi-tool precision positioning and manufacturing system with tools mounted to linear slides and linear X and Z slides and a rotary table to position an object, such as a workpiece on a workhead, with three degrees of freedom in a plane containing the stationary tools.

FIG. 8 shows a multi-tool positioning and manufacturing system 800 with a rotary and linear positioning system 602 with slides for the tools. It is like the embodiment shown in FIG. 6, but the tools are mounted to two slides that supply independent motion of the tools in the X direction. FIG. 8 shows two X direction slides—sliding tables 31 and 33—which are mounted to bases 32 and 34, respectively, as in FIG. 5 and provide the same degrees of freedom as described above with respect to FIG. 5.

Spindle and Workhead Positions

If desired, the tools can be positioned on the positioning system and the workhead and rotary diamond dresser can be mounted on the top plate directly or on slides mounted to the top plate. The positioning system would then move the tools to the workpiece and/or rotary diamond dresser instead of moving the workpiece and/or rotary diamond dresser to the tools. When making a tapered roller bearing cone with three different grinders on an eccentric positioning system, for example, the eccentric positioning system would move the first grinder to the workpiece, then the second grinder, and so on in a process similar to the one described above. The positioning system's top rotary table may be larger (e.g., 1 meter in diameter) to accommodate the grinders, spindles, etc. The spindles may be positioned on the rotary table like spokes on a wheel, with the grinding and cutting surfaces radiating outward.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A multi-tool positioning and manufacturing system comprising:
   a top plate;
   a workhead to support a workpiece in a plane parallel to the top plate;
   a first spindle, fixed with respect to the top plate, to spin a first grinding wheel about a first axis parallel to the top plate;
   a second spindle, fixed with respect to the top plate, to spin a second grinding wheel about a second axis parallel to the top plate; and
   an eccentric positioning system, supporting the workhead, to move the workhead and the workpiece with three degrees of freedom in the plane parallel to the top plate from the first grinding wheel to the second grinding wheel, the three degrees of freedom including two linear degrees of freedom and one rotational degree of freedom in the plane parallel to the top plate.

2. The multi-tool positioning and manufacturing system of claim 1, wherein the workpiece has an axis of symmetry and the workhead is configured to spin the workpiece about the axis of symmetry of the workpiece.

3. The multi-tool positioning and manufacturing system of claim 1, further comprising:
   a grinding wheel dresser, mounted on the eccentric positioning system, to dress the first grinding wheel and the second grinding wheel,
   wherein the eccentric positioning system is configured to move the grinding wheel dresser within the plane parallel to the top plate.

4. The multi-tool positioning and manufacturing system of claim 1, wherein the eccentric positioning system comprises:
   a first rotary table having a first axis of rotation;
   a second rotary table, mounted on the first rotary table, having a second axis of rotation parallel to the first axis of rotation; and
   a third rotary table, mounted on the second rotary table, having a third axis of rotation parallel to the first axis of rotation and the second axis of rotation.

5. The multi-tool positioning and manufacturing system of claim 1, further comprising:
   a controller, operably coupled to the eccentric positioning system, to control motion of the workhead, the workpiece, and/or a grinding wheel dresser according to a motion plan.

6. The multi-tool positioning and manufacturing system of claim 5, wherein the motion plan comprises motion control parameters specific to the workpiece.

7. The multi-tool positioning and manufacturing system of claim 1, further comprising:
   a third spindle, fixed with respect to the top plate, to spin a third grinding wheel about a third axis parallel to the top plate,
   wherein the eccentric positioning system is configured to move the workhead and the workpiece with the three degrees of freedom from the second grinding wheel to the third grinding wheel.

8. A multi-tool positioning and manufacturing system comprising:
   a top plate;
   a workhead to support a workpiece in a plane parallel to the top plate;
   a first spindle, supported by the top plate, to spin a first grinding wheel about a first axis parallel to the top plate;
   a second spindle, supported by the top plate, to spin a second grinding wheel about a second axis parallel to the top plate;
   a grinding wheel dresser, fixed in position with respect to the workhead, to dress the first grinding wheel and the second grinding wheel; and
   an eccentric positioning system, supporting the workhead and the grinding wheel dresser, to move the workhead, the workpiece, and the grinding wheel dresser in the plane parallel to the top plate from the first grinding wheel to the second grinding wheel,
   wherein the first spindle and the second spindle are fixed in position with respect to the top plate.

9. The multi-tool positioning and manufacturing system of claim 8, wherein the workpiece has an axis of symmetry and the workhead is configured to spin the workpiece about the axis of symmetry of the workpiece.

10. The multi-tool positioning and manufacturing system of claim 8, wherein the eccentric positioning system is configured move the workhead laterally within the plane parallel to the top plate and to spin the workhead about an axis perpendicular to the plane parallel to the top plate.

11. The multi-tool positioning and manufacturing system of claim 8, wherein the eccentric positioning system comprises:
    a first rotary table having a first axis of rotation;
    a second rotary table, mounted on the first rotary table, having a second axis of rotation parallel to the first axis of rotation; and
    a third rotary table, mounted on the second rotary table, having a third axis of rotation parallel to the first axis of rotation and the second axis of rotation.

12. The multi-tool positioning and manufacturing system of claim 8, further comprising:
    a controller, operably coupled to the eccentric positioning system, to control motion of the workhead, the workpiece, and/or the grinding wheel dresser according to a motion plan.

13. The multi-tool positioning and manufacturing system of claim 12, wherein the motion plan comprises motion control parameters specific to the workpiece.

14. The multi-tool positioning and manufacturing system of claim 8, further comprising:
    a third spindle, supported by the top plate, to spin a third grinding wheel about a third axis parallel to the top plate,
    wherein the eccentric positioning system is further configured to move the workhead, the workpiece, and the grinding wheel dresser in the plane parallel to the top plate from the second grinding wheel to the third grinding wheel.

* * * * *